United States Patent
Kawamoto et al.

(10) Patent No.: US 6,489,426 B1
(45) Date of Patent: Dec. 3, 2002

(54) PROPYLENE BASE POLYMER AND A POLYPROPYLENE FILM USING THE SAME

(75) Inventors: Naoshi Kawamoto, Chiba (JP); Yasuhiro Shiraishi, Chiba (JP); Atsuko Sawai, Chiba (JP); Yuji Ando, Chiba (JP); Shinji Nakata, Chiba (JP); Hisanobu Minamizawa, Ishikawa (JP); Ichiro Sakabe, Chiba (JP); Katsuhiko Ohno, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/643,742

(22) Filed: Aug. 23, 2000

(30) Foreign Application Priority Data

| Sep. 10, 1999 | (JP) | 11-257584 |
| Sep. 13, 1999 | (JP) | 11-258349 |
| Apr. 18, 2000 | (JP) | 2000-116635 |
| Jul. 7, 2000 | (JP) | 2000-207241 |

(51) Int. Cl.$^7$ .................................. C08F 110/06
(52) U.S. Cl. ............. 526/351; 526/348.2; 526/348.5; 526/348.6
(58) Field of Search ............ 526/348.2, 348.5, 526/348.6, 351

(56) References Cited

U.S. PATENT DOCUMENTS

| 5,726,269 A |   | 3/1998 | Ima et al. ............. 526/351 |
| 6,103,841 A | * | 8/2000 | Ebara et al. ........ 526/125.3 |

FOREIGN PATENT DOCUMENTS

| JP | 58-65709  | 4/1983  |
| JP | 61-23607  | 2/1986  |
| JP | 7-179513  | 7/1995  |
| JP | 7-309912  | 11/1995 |
| JP | 7-309913  | 11/1995 |
| JP | 8-73528   | 3/1996  |
| JP | 9-324014  | 12/1997 |
| JP | 10-7727   | 1/1998  |

* cited by examiner

*Primary Examiner*—David W. Wu
*Assistant Examiner*—William Cheung
(74) *Attorney, Agent, or Firm*—McDermott, Will & Emery

(57) ABSTRACT

Propylene homopolymers or propylene-olefin copolymers, having at least one olefin selected from ethylene and α-olefins having 4 or more carbon atoms where the propylene content in this copolymer is 98% by weight or more, are provided that are suitable for producing films with excellent antistatic performance, high rigidity and metallizability.

5 Claims, No Drawings

PROPYLENE BASE POLYMER AND A POLYPROPYLENE FILM USING THE SAME

TECHNICAL FIELD

The present invention relates to a propylene base polymer and a film comprising the same. More specifically, the present invention relates to a polypropylene film which is excellent in antistatic performance and also relates to a film which has a high rigidity and excellent metallizability, and a propylene base polymer which can provide the same.

BACKGROUND ART

A polypropylene film has excellent rigidity, transparency and gloss and therefore is widely used as a packaging material.

However, a polypropylene film has a high electrical insulating property and is liable to be statically charged, so that various problems are brought about in practical uses. When a polypropylene film is given an antistatic performance by adding an antistatic agent, a large amount of the antistatic agent has to be added in order to obtain the satisfactory performance, and this has caused the problems that the antistatic agent bleeds out on the film surface with time. Further, it is tried to lower a crystallinity of polypropylene to thereby improve an antistatic performance of an antistatic agent added. However, there has been occurred the problem that while the antistatic performance is raised, the resulting polypropylene film is reduced in a rigidity.

And a polypropylene film has an excellent rigidity, transparency and gloss and therefore is widely used as a wrapping material. In general, a polypropylene film has a gas permeability, so that a polypropylene film which is deposited on a surface thereof with metal its used for uses in which a gas barrier property is required such as a food packaging material. However, there is the problem that deposited metal layer is easily peeled off because of a lower adhesiveness between the polypropylene film surface and deposited metal. Publicly known is a technique in which in order to improve a peeling strength of deposited metal, the polypropylene film surface is subjected to corona treatment and/or flame treatment and then metal is deposited. However, these techniques are unsatisfactory for improving the peeling strength, and therefore practical demand allows further improvement in the peeling strength to be desired.

SUMMARY OF THE INVENTION

An object of the present invention is to provide a polypropylene film which is excellent in an antistatic performance and has a high rigidity and a propylene base polymer which can provide the same. Specifically, an object of the present invention is to provide a polypropylene film which has satisfactory antistatic performance in practical use, by adding a small amount of an antistatic agent as compared with those of conventional polypropylenes, which is provided with more excellent antistatic performance than ever by adding the same amount of an antistatic agent as ever and which has a high rigidity, and a propylene base polymer which can provide the same.

Another object of the present invention is to provide a polypropylene film which has a high rigidity and a good metallizability and a propylene base polymer which is suited for producing the above described polypropylene film. In particular, an object of the present invention is to provide a propylene base polymer which is excellent in a film processability and has a good aluminum-depositing property and which is excellent in a rigidity and a polypropylene film comprising the above described propylene base polymer.

The present inventors have made extensive research in order to solve the problems described above. As a result, we have found that a propylene base polymer in which the respective characteristics of an isotactic pentad fraction, a melt flow rate, weight average molecular weights of solubles of 0° C. or lower, 50° C. or lower and 90° C. or lower obtained by a cross fractionation chromatography, boiling pentane extractables and boiling heptane extractables fall in specific ranges, has the anticipated performance, and the film prepared by using polypropylene composition obtained by adding an antistatic agent to the propylene base polymer has excellent antistatic performance and the film prepared by using the propylene base polymer has an excellent metallizability and a high rigidity. And we have achieved the present invention based on the above findings.

The present invention consists in the following items.

1. A propylene base polymer having the following characteristics (1) to (5):
   (1) it is a propylene homopolymer or a propylene-olefin copolymer of propylene with at least one olefin selected from ethylene and α-olefins having 4 or more carbon atoms, wherein a propylene content in this copolymer is 98% by weight or more,
   (2) a melt flow rate (MRF: 230° C., 21.18N) falls in a range of 0.5 to 20 dg/min,
   (3) an isotactic pentad fraction [mmmm] falls in a range of 0.89 to 0.95,
   (4) boiling pentane extractables (C5-Ext) are 0.5% by weight or more; boiling heptane extractables (C7-Ext) are 5% by weight or less; and (C5-Ext) and (C7-Ext) reside in a relation of (C7-Ext)>3.5 (C5-Ext), and
   (5) solubles of 0° C. or lower obtained by a cross fractionation chromatography have a weight average molecular weight of $7\times10^4$ or more, and solubles of 50° C. or lower have a weight average molecular weight of $6\times10^4$ or more.
2. A propylene base polymer according to item 1, further having the following characteristics (6) and (7):
   (6) existential ratio of a meso dyad and a racemic dyad in the pentad comply with a two-site model based on Bernoullian statistics, wherein a statistical parameter α falls in a range of $0.989 \leq \alpha \leq 0.995$, and
   (7) solubles of 90° C. or lower obtained by a cross fractionation chromatography have a weight average molecular weight of $6\times10^4$ or more.
3. A film prepared by using polypropylene composition obtained by adding an antistatic agent to the propylene base polymer as described in item 1.
4. A film prepared by using the propylene base polymer as described in item 2, which the film has an excellent metallizability.

DETAILED DESCRIPTION OF PREFERRED EMBODIMENT

The present invention shall specifically be explained below.

The propylene base polymer of the present invention is a homopolymer of propylene or a copolymer of propylene with at least one olefin selected from ethylene and α-olefins having 4 or more carbon atoms. When the propylene base polymer is a copolymer, a propylene content in the copolymer is 98% by weight or more, preferably 98.5% by weight or more and more preferably 99% by weight or more. Use of such propylene base polymer that a propylene content in the copolymer is less than 98% by weight is liable to provide a film having an unsatisfactory rigidity.

The propylene base polymer of the present invention has a melt flow rate (MRF: 230° C., 21.18N) falling in a range of 0.5 to 20 dg/min, preferably 1 to 15 dg/min. The polymer having an MFR falling in the range described above provides a film which has excellent in an antistatic performance and metallizability and has a high rigidity.

In the propylene base polymer of the present invention, an isotactic pentad fraction [mmmm] which is an index of a stereoregularity of propylene base polymer falls in a range of 0.89≦[mmmm] 0.95, more preferably 0.90≦[mmmm] ≦0.94. The [mmmm] is determined according to a method described in A. Zambelli et al., Macromolecules Volume 8, pp. 687 to 689 (1975). If the [mmmm] is less than 0.89, the antistatic performance is elevated, but the rigidity of the resulting film is reduced. On the other hand, if the [mmmm] exceeds 0.95, the film has a high rigidity, but the antistatic effect is reduced. In this case, the antistatic effect and the antistatic performance mean a surface resistivity of a film blended with an antistatic agent, and the smaller the surface resistivity is, the larger the antistatic effect is, and the more excellent the antistatic performance is.

And also, if the [mmmm] is less than 0.89, the metallizability of the film is elevated but the rigidity of the film is reduced. On the other hand, if the [mmmm] exceeds 0.95, the film has a high rigidity, but the metallizability is damaged.

In this case, the metallizability means an adhesiveness between propylene base polymer and a deposited metal layer in a metallizing film obtained by heating and evaporating desired metal at a vacuum degree of $10^{-4}$ Torr or less to deposit the above gaseous metal on the polypropylene film surface.

Also, the propylene base polymer of the present invention provides a film having a high rigidity and a good metallizability if the existential ratio of a meso dyad and racemic dyad in the pentad comply with a two-site model based on Bernoullian statistics, wherein a statistical parameter α falls in a range of 0.989≦α≦0.995, preferably 0.989≦α≦0.994 and more preferably 0.990≦α≦0.994.

When the α falls in these range, the film having a high rigidity and an excellent metallizability, is obtained.

The two-site model based on Bernoullian statistics is a model described in Y. Inoue, Y. Itabashi, R. Chujo and Y. Doi, Polymer, Volume 25, pp. 1640 to 1644 (1984). If the above statistical parameter α exceeds 0.995, the film having a high rigidity is obtained, but the metallizability is reduced. On the other hand, if the statistical parameter α is less than 0.989, the film has excellent metallizability, but the rigidity is reduced.

In the propylene base polymer of the present invention, the boiling pentane extractables (C5-Ext) have to be 0.5% by weight or more; the boiling heptane extractables (C7-Ext) have to be 5% by weight or less; and (C5-Ext) and (C7-Ext) have to reside in a relation of (C7-Ext)>3.5×(C5-Ext). If the (C5-Ext) are less than 0.5% by weight, the antistatic performance and metallizability are reduced, and if the (C7-Ext) exceed 5% by weight, the resulting film is reduced in a rigidity.

When the (C7-Ext) are less than 3.5 times of the (C5-Ext), the low molecular weight components in the copolymer are excessive, and the resulting film is reduced in a rigidity.

In the propylene base polymer of the present invention, the solubles of 0° C. or lower obtained by a cross fractionation chromatography have a weight average molecular weight of $7 \times 10^4$ or more, and the solubles of 50° C. or lower have a weight average molecular weight of $6 \times 10^4$ or more. If the solubles of 0° C. or lower obtained by the cross fractionation chromatography have a weight average molecular weight of less than $7 \times 10^4$ or the solubles of 50° C. or lower have a weight average molecular weight of less than $6 \times 10^4$, brought about the problem that the resulting film is reduced in a rigidity.

Further, the propylene base polymer of the present invention is preferable which has such a composition that the solubles of 0° C. or lower obtained by a cross fractionation chromatography have a weight average molecular weight of $7 \times 10^4$ or more; the solubles of 50° C. or lower have a weight average molecular weight of $6 \times 10^4$ or more; and solubles of 90° C. or lower have a weight average molecular weight of $6 \times 10^4$ or more.

The metallizability of the resulting film is reduced if the propylene base polymer has such a composition that the solubles of 0° C. or lower obtained by the cross fractionation chromatography have a weight average molecular weight of less than $7 \times 10^4$; the solubles of 50° C. or lower have a weight average molecular weight of less than $6 \times 10^4$; and the solubles of 90° C. or lower have a weight average molecular weight of less than $6 \times 10^4$.

In this case, the cross fractionation chromatography is obtained by combining a temperature-raising elution fractionation method (TREF) with a gel permeation chromatography (GPC), and a crystallinity distribution and a molecular weight distribution of a polymer can be known at the same time. That is, it is a method in which a sample solution at high temperature obtained by completely dissolving a propylene base polymer in ortho-dichlorobenzene is charged into a column filled with an inactive carrier such as glass beads, and the temperature of the column is lowered to deposit the sample onto a carrier surface; then, the temperature of the column is slowly elevated while allowing orthodichlorobenzene to flow in the above column; the concentrations of the propylene polymers eluted at the respective temperatures are detected, and at the same time, the components eluted at the respective temperatures are sent to a GPC apparatus by every fraction by on-line; and the molecular weights and the molecular weight distributions of the respective components are calculated from the chromatograms thus obtained. The higher the crystallinity of the eluted component is, the higher the elution temperature is raised, and therefore a distribution in the crystallinity of the polymer can be known by determining the relation of the elution temperature with the eluted amount (% by weight) of the polymer.

In the method described above, a lowering rate of the column temperature, has to be controlled to a rate required for crystallization of the crystalline component contained in the propylene base polymer of the sample at the respective temperatures, and a raising rate of the column temperature has to be controlled to a rate at which dissolution of the eluted components at the respective temperatures can be completed. Such lowering rate and raising rate of the column temperature is determined by carrying out a preliminary experiment.

(1) Production Process of the Propylene Base Polymer of the Present Invention

The production process of the propylene base polymer of the present invention shall not specifically be restricted as long as it provides the propylene base polymer satisfying the characteristics described above, and the following process can be shown as an example thereof. That is, it is a process in which (co)polymerized propylene or propylene with other olefins using a catalyst comprising a solid catalyst component (A) comprising magnesium, titanium, halogen and an electron-donating organic compound as essential components, an organoaluminum compound (B) and an electron-donating organosilane compound (C).

The solid catalyst component (A) is a catalyst component for polymerizing olefin obtained by carrying halogenated titanium on a carrier comprising a primary structural component of an Mg compound precipitated from a solution state and can be produced by the following method. A magnesium compound represented by a formula $Mg(OR^1)_n(OR^2)_{2-n}$ or $MgR^3_m(OR^4)_{2-m}$ (wherein $R^1$, $R^2$, $R^3$ and $R^4$ each represent independently an alkyl group having 3 to 20 carbon atoms, an aryl group or an aromatic group having 5 to 20 carbon atoms, and m and n each represent independently an integer of 0 to 2) or a mixture thereof is reacted with a monohydric alcohol represented by a formula $R^5OH$ (wherein $R^5$ represents a saturated or unsaturated alkyl group having 1 to 20 carbon atoms) or a polyhydric alcohol in an inactive hydrocarbon solvent in the presence of carbon dioxide to obtain a component (a).

The resulting component (a) is mixed and reacted with halogenated titanium represented by a formula $TiX_p(OR^6)_{4-p}$ (wherein X represents chlorine (Cl), bromine (Br) or iodine (I); $R^6$ represents an alkyl group having 1 to 20 carbon atoms, an aryl group or a cycloalkyl group having 3 to 20 carbon atoms; and p represents an integer of 1 to 4) and halogenated silane represented by a formula $SiX_q(OR^7)_{4-q}$ (wherein X represents Cl, Br or I; $R^7$ represents an alkyl group having 1 to 20 carbon atoms, an aryl group or a cycloalkyl group having 3 to 20 carbon atoms; and q represents an integer of 1 to 4), a siloxane compound having an Si—O—Si bond or a mixture of the above siloxane compound and a silane compound represented by a formula $R^8_sSi(OR^9)_{4-s}$ (wherein $R^8$ and $R^9$ each represent independently an alkyl group having 1 to 20 carbon atoms, an aryl group or a cycloalkyl group having 3 to 20 carbon atoms; and s represents an integer of 1 to 4) to obtain a solid product (I).

The solid product (I) is reacted with a monohydric alcohol represented by a formula $R^{10}OH$ (wherein $R^{10}$ represents a saturated or unsaturated alkyl group having 1 to 20 carbon atoms) or a polyhydric alcohol and a cyclic ether and dissolved and reprecipitated to obtain a solid product (II). A component (b) comprising halogenated titanium represented by the formula $TiX_p(OR^6)_{4-p}$ is reacted with the above solid product (II) to obtain a solid product (III). A mixture of the component (b) and an electron-donating compound (IED) is reacted with the above solid product (III) to thereby obtain a solid product (IV) The solid product (IV) thus obtained can be given as an example of the solid catalyst component (A).

In this case, capable of being given as examples of the electron-donating compound (IED) are oxygen-containing electron-donating compounds such as alcohols, phenols, ketones, aldehydes, carboxylic acids, esters of organic acids or inorganic acids, ethers, acid amides and acid anhydrides, and organosilane compounds such as dialkoxysilanes and trialkoxysilanes.

To be more specific, capable of being given as examples thereof are methanol, ethanol, propanol, butanol, pentanol, hexanol, octanol, phenol, cresol, naphthol, acetone, methyl ethyl ketone, methyl isobutyl ketone, acetophenone, benzophenone, acetaldehyde, propionaldehyde, octylaldehyde, benzaldehyde, naphthaldehyde, methyl formate, methyl acetate, ethyl acetate, vinyl acetate, propyl acetate, octyl acetate, cyclohexyl acetate, cellosolve acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, butyl benzoate, propyl benzoate, octyl benzoate, cyclohexyl benzoate, phenyl benzoate, benzyl benzoate, ethyl toluate, methyl toluate, amyl toluate, ethyl ethylbenzoate, methyl anisate, γ-butyrolactone, α-valerolactone, coumarin, phthalide, diethylphthalate, dibutylphthalate, di-2-methylpropylphthalate, di-2-ethylhexylphthalate, dioctyl phthalate, diheptylphthalate, diisopropylphthalate, dipropylphthalate, dimethylphthalate, succinic anhydride, benzoic anhydride, ethylsilicate, dialkoxysilanes such as dimethyldimethoxysilane, diethyldimethoxysilane, dipropyldimethoxysilane, diisopropyldimethoxysilane, dibutyldimethoxysilane, diisobutyldimethoxysilane, di-t-butyldimethoxysilane, dicyclopentyldimethoxysilane, dicyclohexyl-dimethoxysilane, methylethyldimethoxysilane, methylpropyldimethoxysilane, methylisopropyldimethoxysilane, methylisobutyldimethoxysilane, methylcyclopentyldimethoxysilane, methylcyclohexyldimethoxysilane and isopropylisobutyldimethoxysilane, and trialkoxysilanes such as methyltrimethoxysilane, ethyltrimethoxysilane, propyldimethoxysilane, isopropyltrimethoxysilane, butyltrimethoxysilane, isobutyltrimethoxysilane, cyclohexyltrimethoxysilane, cyclohexyltriethoxysilane, cyclopentyltrimethoxysilane and cyclopentyltriethoxysilane. These electron-donating compounds (IED) can be used as well in combination of two or more kinds thereof.

Capable of being given as examples of the organoaluminum compound (B) are trialkylaluminums such as triethylaluminum, triisobutylaluminums and trihexylaluminum, and dialkylaluminum halides such as diethylaluminum halide. Further, a mixture of trialkylaluminum and dialkylaluminum halide can be given as an example thereof. Triethylaluminum and triisobutylaluminum can be given as the examples of the preferred organic aluminum compound (B)

Capable of being given as examples of the electron-donating organosilane compound (C) are tetraalkoxysilanes such as tetraethoxysilane and tetrapropoxysilane, dialkoxysilanes such as dimethyldimethoxysilane, diethyldimethoxysilane, dipropyldimethoxysilane, dibutyldimethoxysilane, diisobutyldimethoxysilane, dicyclopentyldimethoxysilane, methylethyldimethoxysilane, methylpropyldimethoxysilane, methylisopropyldimethoxysilane, methylisobutyldimethoxysilane, methylcyclopentyldimethoxysilane, methylcyclohexyldimethoxysilane, dimethyldiethoxysilane, diethyldiethoxysilane, dipropyldiethoxysilane, dibutyldiethoxysilane, diisobutyldiethoxysilane, t-butylmethyldiethoxysilane, dicyclopentyldiethoxysilane, methylethyldiethoxysilane, methylpropyldiethoxysilane, methylisopropyldiethoxysilane, methylisobutyldiethoxysilane, methylcyclopentyldiethoxysilane, methylcyclohexyldiethoxysilane and isopropylisobutyldimethoxysilane, and trialkoxysilanes such as methyltrimethoxysilane, methyltriethoxysilane, ethyltrimethoxysilane, ethyltriethoxysilane, propyltrimethoxysilane, propyltriethoxysilane, isopropyltrimethoxysilane, isopropyltriethoxysilane, butyltrimethoxysilane, butyltriethoxysilane, pentyltrimethoxsilane, pentyltriethoxysilane, isobutyltrimethoxysilane, isobutyltriethoxysilane, cyclohexyltrimethoxysilane, cyclohexyltriethoxysilane, cyclopentyltrimethoxysilane, cyclopentyltriethoxysilane, octyltrimethoxysilane, octyltriethoxysilane, dodecyltrimethoxysilane and dodecyltriethoxysilane.

Among them, capable of being preferably given as the examples thereof are diisobutyldimethoxysilane, isopropylisobutyldimethoxysilane, diisobutyldiethoxysilane, propyltrimethoxysilane, propyltriethoxysilane, isobutyltrimethoxysilane, isobutyltriethoxysilane, isopropyltrimethoxysilane, isopropyltriethoxysilane, isobutylmethyldimethoxysilane, isobutylmethyldiethoxysilane, ethyltriethoxysilane, ethyltrimethoxysilane, butyltrimethoxysilane, butyltriethoxysilane, pentyltriethoxysilane and pentyltrimethoxysilane.

These electron-donating organosilane compounds (C) can be used as well in a mixture of two or more kinds thereof.

In the polymerization process for producing the propylene base polymer of the present invention, the solid catalyst component (A) is used preferably in a state that it is subjected to prepolymerization treatment by reacting in advance with a small amount of α-olefin.

The prepolymerization treatment can be carried out using the solid catalyst component (A) and an organoaluminum compound (E).

The organoaluminum compound (B) described above can be used for the organoaluminum compound (E), and the organoaluminum compound (B) and the organoaluminum compound (E) may be the same or different. Triethylaluminum and triisobutylaluminum can be given as the examples of the preferred organoaluminum compound (E).

An electron-donating organosilane compound (D) can be used, if necessary, for the prepolymerization treatment. The electron-donating organosilane compound (C) described above can be used for the electron-donating organosilane compound (D). The electron-donating organosilane compound (D) and the electron-donating organosilane compound (C) may be the same or different.

Capable of being given as the examples of the preferred electron-donating organosilane compound (D) are diisobutyldimethoxysilane, diisobutyldiethoxysilane, propyltrimethoxysilane, propyltriethoxysilane, isobutyltrimethoxysilane, isobutyltriethoxysilane, isopropyltrimethoxysilane, isopropyltriethoxysilane, isobutylmethyldimethoxysilane, isobutylmethyldiethoxysilane, ethyltriethoxysilane, ethyltrimethoxysilane, butyltriethoxysilane and pentyltriethoxysilane.

These organosilane compounds can be used as well in a mixture of two or more kinds thereof.

In the prepolymerization treatment, an inactive hydrocarbon solvent is used for the polymerization reaction, and propane, butane, isobutane, pentane, isopentane, hexane, heptane, octane, benzene and toluene can be given as examples of this hydrocarbon solvent.

With respect to the use proportions of the respective catalyst components in the prepolymerization treatment, the proportions of a titanium atom (Ti) contained in the solid catalyst component (A), an aluminum atom (Al) contained in the organoaluminum compound (E) and a silicon atom (Si) contained in the electron-donating organosilane compound (D) can be selected from the ranges of 1000>Al/Ti>0.05 and 100>Al/Si>0.05, preferably 300>Al/Ti>0.1 and 60>Al/Si>0.1 and more preferably 50>Al/Ti>0.5 and 40>Al/Si>0.8.

The concentration of the solid catalyst component (A) in the hydrocarbon solvent can be selected from a range of 0.05 to 30% by weight, preferably 0.1 to 15% by weight and more preferably 0.5 to 8% by weight.

The prepolymerization treatment can be carried out at a reaction temperature falling in a range of −10 to 90° C., preferably 0 to 60° C. and more preferably 5 to 40° C.

Ethylene, propylene, 1-butene and 1-hexene can be used as an α-olefin used in the prepolymerization treatment. Ethylene and propylene are preferred, and propylene is more preferred. The amount of α-olefin polymerized in the prepolymerization treatment is 0.05 to 100 g, preferably 0.05 to 30 g and more preferably 0.1 to 10 g per g of the solid catalyst component (A).

A method of feeding the respective catalyst components into the hydrocarbon solvent in the pre-polymerization treatment may be either of a method in which the components (A), (E) and (D) are fed at the same time and a method in which they are fed separately. The solvent used in the prepolymerization treatment may be separated from the catalyst subjected to the prepolymerization treatment by decantation, and the same solvent may be used or a solvent different from the solvent used in the pre-polymerization treatment may be substituted for it.

The main polymerization is carried out by using a propylene or propylene and olefin other than propylene, and capable of being used for a polymerization method thereof is any of a slurry polymerization method in which propylene is polymerized by using a hydrocarbon solvent, a solution polymerization method, a bulk polymerization method in which propylene itself used for polymerization is utilized for a dispersing medium in the form of a liquefied propylene and a gas-phase polymerization method in which propylene is polymerized in the form of gaseous propylene without using a dispersing medium. The gas-phase polymerization method is preferably used.

When using the slurry polymerization method, the main polymerization may be carried out in the same solvent as used in the prepolymerization treatment after decanting the solvent used in the prepolymerization treatment or a solvent different from the solvent used in the pre-polymerization treatment.

The respective components in the main polymerization are used in proportions falling in the following ranges.

A proportion of the total amount of aluminum atoms (Al) contained in the organoaluminum compound (B) and the organoaluminum compound (E) to a titanium atom (Ti) contained in the solid catalyst component (A), is selected from a range of 700>Al/Ti>5, preferably 500>Al/Ti>10 and more preferably 300>Al/Ti>10.

A proportion of a silicon atom (Si) contained in the electron-donating organosilane compound (C) to a titanium atom (Ti) contained in the solid catalyst component (A) is selected from a range of 300>Al/Si>0.1, preferably 100>Al/Si>0.51 and more preferably 60>Al/Si>1 a silicon atom (Si) contained in the electron-donating organosilane compound (D) used in the prepolymerization treatment shall be outside calculation).

When using two or more kinds of the electron-donating organosilane compounds (C), the compounds can be added so that the same mole ratio to each electron-donating organo-silane compound is obtained.

In feeding the solid catalyst component (A), the organoaluminum compound (B) and the electron-donating organosilane compound (C) each described above to a propylene polymerization system in the main polymerization, the components (A), (B) and (C) can be fed either at the same time or separately.

The main polymerization is different in polymerization conditions according to the selected production process but can usually be carried out at an industrially suitable polymerization temperature and polymerization pressure. For example, the polymerization temperature can be controlled to a range of 0 to 100° C., preferably 20 to 90° C. and more preferably 30 to 85° C. In the case of a slurry polymerization method, the polymerization pressure can be controlled to a propylene partial pressure in a gas phase part falling in a range of 0.01 to 1.5 MPa, preferably 0.1 to 1.3 MPa and more preferably 0.3 to 1.2 MPa. In the case of a bulk polymerization method, the propylene partial pressure in the gas phase part is fundamentally prescribed by the polymerization temperature.

Further, in the case of a gas-phase polymerization method, the propylene partial pressure can be controlled to a range of 0.1 to 3.5 MPa, preferably 0.5 to 3.0 MPa and more preferably 1 to 2.8 MPa.

In the main polymerization, a molecular weight-controlling agent can suitably be used for the purpose to control a molecular weight of resulting polypropylene. Hydrogen can suitably be used as a molecular weight-controlling agent, that is, a chain transfer agent. Further, the polymerization can be carried out as well by disposing several polymerization vessels in series. In this case, the polymerization conditions of the respective polymerization vessels may be the same or different.

Further, in the main polymerization, propylene is homopolymerized or unsaturated hydrocarbons selected from ethylene, 1-butene, 1-pentene, 1-hexene and 1-octene as the other olefin are copolymerized with propylene.

When using a slurry polymerization method and a bulk polymerization method, a component (a soluble polymer) dissolved in a hydrocarbon solvent or liquefied propylene can be removed from the propylene base polymer but can be added, if necessary, to the product.

Thus, the propylene base polymer of the present invention satisfying the requisites described in claim 1 or claim 2 is obtained.

(2) Polypropylene Film

The propylene base polymer of the present invention can suitably be used as a raw material for a biaxially oriented polypropylene film obtained by conventionally known film-fabricating processes, for example, a tenter process in which sequential orientation is carried out and a tubular process in which simultaneous biaxial orientation is carried out. A process for producing a polypropylene film using the propylene polymers of the present invention shall specifically be explained below with reference to the tenter process as an example thereof.

An antistatic agent and, if necessary, additives such as an antioxidant, a light-resisting agent, a weathering agent, a lubricant, an antiblocking agent and a colorant are added to the propylene base polymer as long as the object of the present invention is not damaged to thereby prepare a polypropylene composition. Usually, the composition described above is pelletized by means of an extruder.

A polypropylene film described in claim 4, is prepared by using the composition which additives such as an antioxidant, a light-resisting agent, a weathering agent, a lubricant, an antiblocking agent and a colorant are added to the propylene base polymer, as long as the object of the present invention is not damaged to thereby.

Usually, the composition described above is pelletized by means of an extruder.

Well known antistatic agents can be used for the antistatic agent. Anionic surfactants, cationic surfactants, nonionic surfactants and amphoteric surfactants can be given as examples of the above antistatic agent.

Capable of being given as examples of the anionic surfactants are fatty acid salts, higher alcohol sulfuric acid ester salts, liquid fatty oil sulfuric acid ester salts, sulfuric acid salts of aliphatic amines, aliphatic amides, sulfonic acid salts of dibasic fatty acid esters, alkylallylsulfonic acid salts and formalin-condensed naphthalenesulfonic acid salts.

Aliphatic amine salts, quaternary ammonium salts and alkylpyridinium salts can be given as examples of the cationic surfactants. Capable of being given as examples of the nonionic surfactants are polyoxyethylene alkyl ethers, polyoxyethylene alkylphenol ethers, polyoxyethylene alkyl esters, sorbitan alkyl esters and polyoxyethylene sorbitan alkyl esters. Imidazoline derivative surfactants, higher alkyl amino surfactants (pentaine type), sulfuric acid ester and phosphoric acid ester surfactants and sulfonic acid surfactants can be given as examples of the amphoteric surfactants.

Capable of being given as examples of a surfactant mixture are anionic mixture surfactants, cationic mixture surfactants, nonionic mixture surfactants, anionic and nonionic mixture surfactasnts and cationic and nonionic mixture surfactants.

The polypropylene composition molten in the extruder is extruded from a T die and molded into a sheet. Then, it is cooled and solidified on a chill-roll, and subsequently the above tabular molded article is stretched in a longitudinal direction (machine direction: hereinafter referred to as [vertical direction]) by means of a heated roll to prepare a monoaxially oriented film. Then, the monoaxially oriented film thus obtained is introduced into a tenter, passed through a preheating part and stretched in a lateral direction (transverse direction:hereinafter referred to as [lateral direction]), and it is rolled up to thereby obtain the polypropylene film of the present invention.

In the tenter process described above, the melting temperature of the polypropylene composition in the extruder falls in a range of 200 to 300° C., preferably 220 to 280° C. The preheating temperature in stretching in a vertical direction, falls preferably in a range of 110 to 160° C.; the stretching temperature in a vertical direction falls preferably in a range of 110 to 160° C.; and the stretching ratio in a vertical direction falls preferably in a range of 3.0 to 9.0 times.

The preheating temperature in stretching in a lateral direction, falls preferably in a range of 160 to 200° C.; the stretching temperature in a lateral direction falls preferably in a range of 140 to 170° C.; and the stretching ratio in a lateral direction, falls preferably in a range of 3.0 to 11.0 times.

Use of the polypropylene composition comprising the propylene base polymer of the present invention as a raw material makes it possible to prepare a biaxially oriented film at a high speed and a high efficiency by the tenter process described above. The resulting film can be subjected, if necessary, to heat treatment for stress relaxation or corona treatment and flame treatment for improving the printability and the metallizability.

Included in the film of the present invention are a laminated film prepared by laminating with other films and a metal-deposited film obtained by depositing metal thereon as well as a single layer film of itself.

Conventional methods can be applied as a method for depositing metal on the biaxially oriented polypropylene film according to the present invention. Capable of being used is, for example, a method in which prescribed metal is heated, molten and evaporated in a vacuum deposition apparatus having a vacuum degree of $10^{-4}$ Torr or less, to deposit gaseous metal on a biaxially oriented film surface which is improved in a wetting property by corona treatment or flame treatment. In addition to the above vacuum deposition method, a spattering deposition method and an ion plating method can be used. Examples of metal used for deposition include gold, silver, platinum, copper, nickel, chromium, tin, titanium, zinc, germanium, aluminum and selenium which are usually used. In particular, aluminum is suitably used for a packaging material.

The Effect of the Present Invention

When the propylene base polymer described in claim 1 of the present invention, is used, obtained is the film having the satisfactory antistatic performance in practical use, by adding a small amount of an antistatic agent compared with those of a conventional propylene base polymer and the excellent antistatic performance by adding the same amount of an antistatic agent as used for a conventional propylene base polymer, and a polypropylene film having a high rigidity is obtained.

The propylene base polymer described in claim 2 of the present invention is suited for fabricating a film having a high Young's modulus (excellent rigidity), a small heat-shrinkage ratio (excellent heat resistance) and a good metallizability. That is, conventional metal-deposited biaxially oriented polypropylene films have had the defects that the adhesiveness with metal is weak and a metal-deposited film is lifted and separated due to friction and that the deposited film is peeled off by blocking under a high temperature and a high humidity. However, the polypropylene film of the present invention is characterized by that it has an excellent heat resistance as well as an increased adhesiveness with a deposited film, so that it is less liable to cause lifting of the deposited film. Further, if a composition containing the propylene base polymer of the present invention is used for a molding material, a biaxially oriented polypropylene film can be fabricated at a high efficiency by a tenter process.

EXAMPLES

Next, the present invention shall be explained below in further details with reference to examples, but the present invention shall not be restricted to the examples shown below. Measuring methods for the respective physical property values used in the examples and the comparative examples shall be shown below.

(i) Isotactic Pentad Fraction

A $^{13}$C-NMR measuring apparatus (GSX-270 type manufactured by JEOL Ltd.) was used to determine it according to a method described in A. Zambelli et al., Macromolecules Volume 8, pp. 687 to 689 (1975).

(ii) A Two-site Model Based on Bernoullian Statistics and Statistical Parameter

A statistical parameter was obtained according to a model described in Y. Inoue, Y. Itabashi, R. Chujo and Y. Doi, Polymer, Volume 25, pp. 1640 to 1644 (1984). When the existential ratio of a meso dyad and a racemic dyad in the pentad which are measured by a nuclear magnetic resonance method (NMR) of resulting propylene base polymer comply with a relational equation of the two-site model described in the above literature, the statistical parameter a can be determined. In the present specification, propylene base polymer which complies with a two-site model based on Bernoullian statistics, has been defined by propylene base polymer in which a correlation coefficient between a measured value and a calculated value in model calculation is 0.999 or more.

(iii) Melt Flow Rate (dg/min)

Determined according to a method (condition 14:230° C., 21.18N) described in JIS K7210.

(iv) Young's Modulus (MPa)

A test piece having a width of 10 mm and a length of 150 mm, was cut out from a biaxially oriented polypropylene film in the respective directions of MD (vertical direction) and TD (lateral direction) to determine a Young's modulus at a distance of 50 mm between the clamps and a tensile speed of 5 mm/min according to ASTM D0.882

(v) Heat-shrinkage Ratio (%)

Test pieces having a length ($L_0$) of 20 mm and a width of 1 cm were cut out from a biaxially oriented polypropylene film in a vertical direction and a lateral direction, respectively, and each test piece was heated for 15 minutes in an oven of 140° C. Then, each length ($L_1$, unit: cm) was measured to determine a shrinkage ratio (S %) in each measuring direction according to the following equation:

$$S=100\times(L_0-L_1)/L_0$$

(vi) Cross Fractionation Chromatography

Determined on the following conditions by means of a CFC apparatus (T150A type, detector: infrared detector, measuring wavelength: 3.41 μm, column: bore diameter of 4.6 mm×150 mm, filler: glass beads (Shodex GPC AD-806MS manufactured by Showa Denko K.K.)) manufactured by Mitsubishi Chemical Corporation.

A column heated at 40° C. was charged with 4 ml of a sample solution (solvent: ortho-dichlorobenzene, sample concentration: 40 mg/10 ml) and then cooled down to 0° C. at a rate of 60° C./hour to adsorb (deposit) a sample polymer on a filler surface.

Then, a component which was dissolved in the solvent without adsorbing on the filler surface, was fed as solubles of 0° C. or lower into a GPC column by on-line to carry out molecular weight fractionation, and then an eluted amount was detected by means of an infrared detector.

Next, the column was gradually heated step by step up to 50° C. while allowing ortho-dichlorobenzene to flow at a rate of 60 ml/hour, and the polymers eluted from the filler surface at the respective temperatures were fed in order, into a GPC column by on-line to carry out molecular weight fractionation, and then the eluted amounts were detected by means of the infrared detector.

The solubles of up to 50° C. mean the total amount of solubles of 50° C. or lower including the solubles of 0° C. or lower and were determined by integrating the results obtained in every step heating up to the above temperature. Similarly, the solubles of 90° C. or lower mean the total amount of solubles of up to 90° C. including the solubles of 0° C. or lower and were determined by integrating the results obtained in every step heating up to the above temperature.

(vii) Boiling Pentane Extractables and Boiling Heptane Extractables

A sheet obtained by pressing the propylene base polymer at 230° C. and 10 MPa was cut into a strip of 3 cm×3 cm by means of a cutter. The resulting strips 50 g were crushed for about 20 minutes by means of a Willey crusher (Ikeda: W140). This crushed material of 2 g was extracted by means of a Soxhlet extractor (solvent 150 ml; pentane or heptane, extraction time: 3 hours). The extraction residue was vacuum-dried at 80° C. for 2 hours when using pentane and 3 hours when using heptane, respectively. It was left cooling in a desiccator for one hour and then weighed to calculate the extractables.

(viii) Surface Resistivity

A sample film (8 cm×8 cm) was subjected to aging at 40° C. for 2 days, and a voltage of 500 V was applied to this film subjected to aging treatment for 2 minutes, and then it was left standing for one minute. Immediately thereafter, a surface resistivity of the film was measured (two days after aging at 40° C.). Subsequently, this film was subjected to aging at 40° C. for 3 days (total 5 days), and a voltage of 500 V was applied for 2 minutes, and then the film was left standing for one minute to measure the surface resistivity. R8340A-Ultra High Resistance Meter manufactured by ADVANTEST CORPORATION was used as a measuring apparatus.

(ix) Adhesiveness (N/15 mm)

Aluminum was deposited on one surface of a biaxially oriented polypropylene film, and an aluminum-deposited surface of the resulting deposited film and a non-oriented polypropylene film (thickness: 20 mmm), were stuck together with an adhesive for dry laminate and subjected to aging at 40° C. for 2 days, and after the adhesive was completely dried, the peel strength of 90 degrees on an interface, was determined by means of a tensile tester.

Example 1

(1) Synthesis of Solid Catalyst Component (A)

2.3 kg of magnesium ethoxide, 4.15 L of 2-ethyl-1-hexanol and 16.5 L of toluene. were charged to an autoclave of 30 liter (hereinafter liter shall be referred to as L) which was equipped with a stirrer, a pressure gauge and a thermometer and which was substituted with high purity nitrogen. This mixture was heated to 90° C. under carbon dioxide gas atmosphere of 0.2 MPa (hereinafter means a gauge pressure) and stirred at 150 rpm for 3 hours. The resulting solution was cooled down, and carbon dioxide gas was deaerated to obtain a solution (a). This solution (a) contained 0.1 g/L of magnesium ethoxide. The operation described above was carried out under an atmospheric pressure.

3L of toluene, 190 ml of $TiCl_4$ and 250 ml of hexamethyldisiloxane were charged to an autoclave (baffle factor: 0.15) of 15L which was equipped with a stirrer, a thermometer, a condenser, a nitrogen seal line and a baffle, and were stirred at a room temperature and 250 rpm for 5 minutes, and then 1.5 L of the solution (a) was added thereto in 10 minutes. After adding, solid particles (I) were immediately precipitated. Added to a solution containing the above solid particles (I) were 30 ml of ethanol and 0.5 L of tetrahydrofuran (THF), and the temperature was elevated to 60° C. within 15 minutes while maintaining stirring at 150 rpm. The solid particles (I) were once dissolved, and then solid particles started to be precipitated again within 15 minutes. Formation of these solid particles was finished within 10 minutes. Further, stirring was continued at 60° C. for 45 minutes, and then stirring was stopped to settle down a produced solid material (II).

The supernatant was removed by decantation, and the remaining produced solid material (II) was washed twice with 2 L of toluene.

Added to the produced solid material (II) thus obtained were 2 L of toluene and 1 L of $TiCl_4$, and the temperature was elevated to 135° C. within 20 minutes while stirring at 250 rpm. This temperature was maintained for one hour, and then stirring was stopped. A produced solid material (III) was settled down, and the supernatant was removed by decantation.

Added to the produced solid material (III) were 1 L of $TiCl_4$, 2.5 L of toluene and 21 ml of diisobutyl phthalate. The solution was heated to 135° C. and stirred at 250 rpm for 1.5 hour. The supernatant was removed by decantation, and 2 L of $TiCl_4$ was added to the remainder, followed by refluxing for 10 minutes while stirring. The supernatant was removed by decantation, and the remainder was washed three times with 2 L of toluene and further four times with 2 L of hexane to obtain 116 g of a solid catalyst component (A).

Contained in this solid catalyst component (A) were 17.3% by weight of magnesium, 2.3% by weight of titanium, 55.6% by weight of chlorine and 8.6% by weight of diisobutylphthalate.

(2) Prepolymerization Treatment

A stainless steel reactor having a content volume of 50 L which was equipped with a stirrer and substituted with high purity nitrogen was charged with 20 L of hexane, 100 g of the solid catalyst component (A), 0.1 mole of triethylaluminum and 0.015 mole of diisobutyldimethoxysilane. Propylene gas was introduced thereinto while stirring at a revolution speed of 200 rpm until a propylene partial pressure became 0.1 MPa, and then pressure was applied to carry out prepolymerization treatment for 6 hours, followed by purging propylene gas. The amount of polymerized propylene was 3 g per g of the solid catalyst component (A).

(3) Main Polymerization

The solid catalyst component (A) subjected to the prepolymerization treatment, was continuously fed into a stainless steel reactor having a content volume of 100 L which was equipped with a stirrer and substituted with high purity nitrogen, as a solid catalyst component at 0.5 g/hour, triethylaluminum at 0.018 mole/hour and diisobutyldimethoxysilane at 0.003 mole/hour, respectively. At the same time, propylene was continuously fed so that the polymerization pressure was maintained at 2.3 MPa under a condition of a polymerization temperature of 70° C., and hydrogen was continuously fed so that a hydrogen/propylene mole ratio in a gas phase part became 0.003 to carry out a continuous gas phase polymerization of propylene to obtain a powdery propylene polymers at a production rate of 15 kg/hour.

(4) Pelletization (Production of Polypropylene Composition)

Added to 100 parts by weight of the resulting powdery propylene base polymer were 0.10 part by weight of tetrakis-[methylene-3-(3',5'-di-t-butyl-4'-hydroxyphenyl) propionate]methane as an antioxidant, 0.10 part by weight of tris(2,4-di-t-butylphenyl)phosphite, 0.05 part by weight of potassium stearate and one part by weight of alkyldiethanolamine fatty acid ester, glycerin fatty acid ester and alkyldiethanolamine as an antistatic agent, and they were well mixed by means of a Hönschell mixer (trade name). The resulting mixture was molten and kneaded at an extruding temperature of 230° C. by means of an extruder having a bore diameter of 65 mm and an L/D of 30 to obtain a pelletized polypropylene composition.

(5) Film Fabrication

The pelletized polypropylene composition was extruded at 250° C. by means of an extruder equipped with a T die and received on a chill roll to obtain a polypropylene tabular molded article. Then, the above tabular molded article was stretched by 5 times in a vertical direction at a stretching temperature of 145° C. by means of a tenter type sequential stretching apparatus. Subsequently, it was stretched by 10 times in a lateral direction in the tenter in which a bath temperature in a stretching zone was 160° C., and it was further subjected to stress relaxation treatment of 8% at 170° C. to obtain a biaxially stretched polypropylene film having a thickness of 20 $\mu$m.

(6) Evaluation

Measured were the physical properties of (i), (iii) to (viii) described above in the polypropylenes and the biaxially oriented polypropylene films thus obtained. The results thereof are shown in Table 1, Table 2 and Table 3. Shown in Table 1 are the isotactic pentad fraction [mmmm], the boiling pentane extractables, the boiling heptane extractables, the ethylene contents and the melt flow rate; shown in Table 2 are the analytical results given by the cross fractionation chromatography; and shown in Table 3 are various physical properties measuring results of the biaxially oriented polypropylene films.

Comparative Example 1

A solid catalyst component (A) was obtained according to the method described in (1) of Example 1. Prepolymerization treatment was carried out in the same manner as in Example 1, except that diisopropyldimethoxysilane was substituted for diisobutyldimethoxysilane used in (2) of Example 1. The main polymerization was carried out in the same manner as in Example 1, except that the hydrogen/propylene mole ratio in (3) of Example 1 was changed from 0.003 to 0.005 and that diisopropyldimethoxysilane was substituted for diisobutyldimethoxysilane to obtain a powdery propylene polymer at a production rate of 14 kg/hour. Pelletization and film fabrication were carried out in the same manner as in Example 1.

The physical property values of the propylene base polymer and the biaxially oriented polypropylene film thus obtained are shown in Table 1, Table 2 and table 3.

Example 2

A solid catalyst component (A) was obtained according to the method described in Example 1, except that a mixture of 16 ml of diisobutylphthalate and 6 ml of di-n-octyl phthalate was substituted for 21 ml of diisobutylphthalate used in (1) of Example 1. Prepolymerization treatment was carried out according to the method described in (2) of Example 1. The main polymerization was carried out according to the method described in (3) of Example 1, except that the hydrogen/propylene mole ratio was changed to 0.0025 to obtain a powdery propylene base polymer at a production rate of 15 kg/hour. Pelletization and film fabrication were carried out in the same manner as in Example 1.

The physical property values of the propylene base polymer and the biaxially oriented polypropylene film thus. obtained are shown in Table 1, Table 2 and Table 3.

Example 3

According to the methods described in Example 1, a solid catalyst component (A) was produced, and pre-polymerization treatment was carried out. The main polymerization was carried out in the same manner as in Example 2, except that the hydrogen/propylene mole ratio was set to 0.003 and that an ethylene/propylene mixed gas having an ethylene/propylene mole ratio of 0.0015 was substituted for propylene to obtain a powdery propylene base polymer at a production rate of 15.5 kg/hour.

Pelletization and film fabrication were carried out in the same manner as in Example 1.

The physical property values of the propylene base polymer and the biaxially oriented polypropylene film thus obtained are shown in Table 1, Table 2 and Table 3.

Example 4

According to the methods described in Example 2, a solid catalyst component (A) was produced, and pre-polymerization treatment was carried out. The main polymerization was carried out in the same manner as in Example 2, except that the hydrogen/propylene mole ratio was set to 0.0025 and that an ethylene/propylene mixed gas having an ethylene/propylene mole ratio of 0.001 was substituted for propylene to obtain a powdery propylene base polymer at a production rate of 16 kg/hour.

Pelletization and film fabrication were carried out in the same manner as in Example 1.

The physical property values of the propylene base polymer and the biaxially oriented polypropylene film thus obtained are shown in Table 1, Table 2 and Table 3.

Comparative Example 2

A powdery propylene base polymer was obtained at a production rate of 16.1 kg/hour in the same manner as in Comparative Example 1, except that the hydrogen/propylene mole ratio was changed from 0.005 to 0.004 in the main polymerization of Comparative Example 1 and that an ethylene/propylene mixed gas having an ethylene/propylene mole ratio of 0.0017 was substituted for propylene.

Pelletization and film fabrication were carried out in the same manner as in Example 1.

The physical property values of the propylene base polymer and the biaxially oriented polypropylene film thus obtained are shown in Table 1, Table 2 and Table 3.

Example 5

A powdery propylene base polymer was obtained at a production rate of 15.9 kg/hour according to the method described in Example 4, except that the hydrogen/propylene mole ratio was set to 0.0025 in the main polymerization of Example 4 and that an ethylene/propylene mixed gas having an ethylene/propylene mole ratio of 0.001 was substituted for propylene.

Pelletization and film fabrication were carried out according to the method described in Example 1.

The physical property values of the propylene base polymer and the biaxially oriented polypropylene film thus obtained are shown in Table 1, Table 2 and Table 3.

TABLE 1

|  | Example 1 | Comparative Example 1 | Example 2 | Example 3 | Example 4 | Comparative Example 2 | Example 5 |
|---|---|---|---|---|---|---|---|
| [mmmm] | 0.9386 | 0.9723 | 0.9254 | 0.9295 | 0.9070 | 0.9519 | 0.9058 |
| Pentane extractables (%) | 0.5 | 0.3 | 0.7 | 0.6 | 0.7 | 0.7 | 0.7 |
| Heptane extractables (%) | 2.0 | 0.9 | 3.3 | 2.4 | 4.3 | 2.0 | 4.5 |
| Ethylene content (%) | 0 | 0 | 0 | 0.25 | 0.24 | 0.21 | 0.43 |
| MRF (dg/min) | 2.2 | 2.5 | 2.3 | 2.4 | 2.8 | 2.6 | 2.6 |

TABLE 2

|  | Example 1 | Comparative Example 1 | Example 2 | Example 3 | Example 4 | Comparative Example 2 | Example 5 |
|---|---|---|---|---|---|---|---|
| Weight average molecular weight of solubles of 0° C. or lower | $7.4 \times 10^4$ | $1.1 \times 10^4$ | $7.3 \times 10^4$ | $8.0 \times 10^4$ | $7.6 \times 10^4$ | $2.4 \times 10^4$ | $8.4 \times 10^4$ |
| Weight average molecular weight of solubles of 50° C. or lower | $7.7 \times 10^4$ | $1.1 \times 10^4$ | $7.3 \times 10^4$ | $8.0 \times 10^4$ | $6.6 \times 10^4$ | $1.1 \times 10^4$ | $7.0 \times 10^4$ |

TABLE 3

|  | Young's modulus [Mpa] MD/TD | Heat-shrinkage Ratio [%] MD/TD | Surface resistivity ( ) | |
|---|---|---|---|---|
|  |  |  | After aging at 40° C. for 2 days | After aging at 40° C. for 5 days |
| Example 1 | 2100/3700 | 3.5/2.5 | $5 \times 10^{12}$ | $2 \times 10^{11}$ |
| Comparative Example 1 | 2300/3900 | 3.0/2.0 | $9 \times 10^{12}$ | $6 \times 10^{11}$ |
| Example 2 | 2050/3550 | 4.0/3.0 | $4 \times 10^{11}$ | $7 \times 10^{10}$ |
| Example 3 | 2050/3600 | 4.0/3.0 | $3 \times 10^{11}$ | $8 \times 10^{10}$ |
| Example 4 | 2000/3500 | 4.3/3.3 | $4 \times 10^{10}$ | $3 \times 10^{10}$ |
| Comparative Example 2 | 2100/3700 | 4.0/3.0 | $7 \times 10^{12}$ | $6 \times 10^{11}$ |
| Example 5 | 1950/3450 | 4.5/3.5 | $5 \times 10^{10}$ | $2 \times 10^{10}$ |

Example 6

(1) Synthesis of Solid Catalyst Component (A)

2.3 kg of magnesium ethoxide, 4.15 litter (hereinafter litter shall be referred to as L) of 2-ethyl-1-hexanol and 16.5 L of toluene, were fed into an autoclave of 30 L which was equipped with a stirrer, a pressure gauge and a thermometer and which was substituted with high purity nitrogen.

This mixture was heated to 90° C. under carbon dioxide gas atmosphere of 0.2 MPa and stirred at 150 rpm for 3 hours. The resulting solution was cooled down, and carbon dioxide gas was deaerated to obtain a solution (a). This solution (a) contained 0.1 g/L of magnesium ethoxide. The operation described above was carried out under an atmospheric pressure.

3L of toluene, 190 ml of $TiCl_4$ and 250 ml of hexamethyldisiloxane were fed into an autoclave (baffle factor: 0.15) of 15 L, equipped with a stirrer, a thermometer, a condenser, a nitrogen seal line and a baffle, the mixture was stirred at a room temperature, at 250 rpm for 5 minutes, and then 1.5 L of the solution (a) was added thereto in 10 minutes. After adding, solid particles (I) were immediately precipitated. Added to a solution containing the above described solid particles (I) were 30 ml of ethanol and 0.5 L of tetrahydrofuran (THF), and the temperature was elevated to 60° C. within 15 minutes while maintaining stirring at 150 rpm. The solid particles (I) were once dissolved, and then solid particles started to be precipitated again within 15 minutes. Formation of these solid particles was finished within 10 minutes. Further, stirring was continued at 60° C. for 45 minutes, and then stirring was stopped to settle down a produced solid material (II).

The supernatant was removed by decantation, and the remaining produced solid material (II) was washed twice with 2 L of toluene. Added to the produced solid material (II) were 2 L of toluene and 1 L of $TiCl_4$, and the temperature was elevated to 135° C. within 20 minutes while stirring at 250 rpm. This temperature was maintained for one hour, and then stirring was stopped. A produced solid material (III) was settled down, and the supernatant was removed by decantation.

Added to the produced solid material (III) were 1 L of $TiCl_4$, 2.5 L of toluene and 21 ml of diisobutylphthalate. The solution was heated to 135° C. and stirred at 250 rpm for 1.5 hours. The supernatant was removed by decantation, and 2 L of $TiCl_4$ was added to the remainder, followed by refluxing for 10 minutes while stirring. The supernatant was removed by decantation, and the remainder was washed three times with 2 L of toluene and further four times with 2 L of hexane to obtain 116 g of a solid catalyst component (A). Contained in this solid catalyst component (A) were 17.3% by weight of magnesium, 2.3% by weight of titanium, 55.6% by weight of chlorine and 8.6% by weight of diisobutylphthalate.

(2) Prepolymerization Treatment

A stainless steel reactor having a content volume of 50 L which was equipped with a stirrer and substituted with high purity nitrogen was charged with 20 L of hexane, 100 g of the solid catalyst component (A), 0.1 mole of triethylaluminum and 0.015 mole of diisobutyldimethoxysilane. Propylene gas was introduced thereinto while stirring at a revolution speed of 200 rpm until a propylene partial pressure became 0.1 MPa, and then pressure was applied to carry out prepolymerization treatment for 6 hours, followed by purging propylene gas. The amount of polymerized propylene was 3 g per g of the solid catalyst component (A).

(3) Main Polymerization

The solid catalyst component (A) subjected to the prepolymerization treatment as a solid catalyst component at 0.5 g/hour, triethylaluminum at 0.018 mole/hour and diisobutyldimethoxysilane at 0.003 mole/hour, respectively, was continuously fed into a stainless reactor having a content volume of 100 L which was equipped with a stirrer and substituted with high purity nitrogen.

At the same time, propylene was continuously fed thereto so that the polymerization pressure was maintained at 2.3 MPa under a condition of a polymerization temperature of 70° C., and hydrogen was continuously fed so that a hydrogen/propylene mole ratio in a gas phase part became 0.003 to carry out a continuous gas-phase polymerization of propylene to obtain powdery propylene base plymer at a production rate of 15 kg/hour.

(4) Pelletization (Production of Polypropylene Composition)

Added to 100 parts by weight of the resulting powdery propylene base polymer were 0.10 part by weight of tetrakis-[methylene-3-(3',5'-di-t-butyl-4'-hydroxyphenyl) propionate]methane of an antioxidant, 0.10 part by weight of tris(2,4-di-t-butylphenyl)phosphite and 0.03 part by weight of hydrotalcite, and they were well mixed by means of a Hönschell mixer (trade name). The resulting mixture was molten and kneaded at an extruding temperature of 230° C. by means of an extruder having a bore diameter of 65 mm and an L/D of 30 to obtain a pelletized polypropylene composition.

(5) Film Fabrication

The pelletized polypropylene composition was extruded at 250° C. by means of an extruder equipped with a T die and received on a chill roll to obtain a polypropylene tabular molded article. Then, the above tabular molded article was stretched by 5 times in a vertical direction at a stretching temperature of 145° C. by means of a tenter type sequential stretching apparatus. Subsequently, it was stretched by 10 times in a lateral direction in the tenter in which a bath temperature in a stretching zone was 160° C., and it was further subjected to stress relaxation treatment of 8% at 170° C. to obtain a biaxially oriented polypropylene film having a thickness of 20 μm.

(6) Evaluation

Measured were the physical properties of (i) to (vii) and (ix) described above in the propylene base polymer and the biaxially oriented polypropylene films thus obtained. The results thereof are shown in Table 4, Table 5 and Table 6. Shown in Table 4 are the isotactic pentad fraction [mmmm], the boiling pentane extractables, the boiling heptane extractables, the ethylene contents and the melt flow rates; shown in Table 5 are the analytical results given by the cross fractionation chromatography; and shown in Table 6 are various physical properties-measured results of the biaxially oriented polypropylene films.

Comparative Example 3

A solid catalyst component (A) was obtained according to the method described in (1) of Example 6. Prepolymerization treatment was carried out in the same manner as in Example 6, except that diisopropyldimethoxysilane was substituted for diisobutyldimethoxysilane used in (2) of Example 6.

The main polymerization was carried out in the same manner as in Example 6, except that the hydrogen/propylene mole ratio was in (3) of Example 6 changed from 0.003 to 0.005 and that diisopropyldimethoxysilane was substituted for diisobutyldimethoxysilane to obtain powdery propylene base polymer at a production rate of 14 kg/hour.

Pelletization and film fabrication were carried out in the same manner as in Example 6.

The physical property values of the propylene base polymer and the biaxially oriented polypropylene film thus obtained are shown in Table 4, Table 5 and Table 6.

Example 7

A solid catalyst component (A) was obtained according to the method described in Example 6, except that a mixture of 16 ml of diisobutylphthalate and 6 ml of di-n-octyl phthalate was substituted for 21 ml of diisobutyl phthalate used in (1) of Example 6. Prepolymerization treatment was carried out according to the method described in (2) of Example 6.

The main polymerization was carried out according to the method described in (3) of Example 6, except that the hydrogen/propylene mole ratio was changed to 0.0025 to obtain powdery propylene base polymer at a production rate of 15 kg/hour. Pelletization and film fabrication were carried out in the same manner as in Example 6.

The physical property values of the propylene base polymer and the biaxially oriented polypropylene film thus obtained are shown in Table 4, Table 5 and Table 6.

Example 8

According to the methods described in Example 6, a solid catalyst component (A) was produced, and prepolymerization treatment was carried out.

The main polymerization was carried out in the same manner as in Example 7, except that the hydrogen/propylene mole ratio was set to 0.003 and that an ethylene/propylene mixed gas having an ethylene/propylene mole ratio of 0.0015 was substituted for propylene to obtain powdery propylene base polymer at a production rate of 15.5 kg/hour.

Pelletization and film fabrication were carried out in the same manner as in Example 6.

The physical property values of the propylene base polymer and the biaxially oriented polypropylene film thus obtained are shown in Table 4, Table 5 and Table 6.

Example 9

According to the methods described in Example 7, a solid catalyst component (A) was produced, and prepolymerization treatment was carried out.

The main polymerization was carried out in the same manner as in Example 7, except that the hydrogen/propylene mole ratio was set to 0.0025 and that an ethylene/propylene mixed gas having an ethylene/propylene mole ratio of 0.001 was substituted for propylene to obtain powdery propylene base polymer at a production rate of 16 kg/hour.

Pelletization and film fabrication were carried out in the same manner as in Example 6.

The physical property values of the propylene base polymer and the biaxially oriented polypropylene film thus obtained are shown in Table 4, Table 5 and Table 6.

Comparative Example 4

Powdery propylene base polymer was obtained at a production rate of 16.1 kg/hour in the same manner as in Comparative Example 3, except that the hydrogen/propylene mole ratio was changed from 0.005 to 0.004 in the main polymerization of Comparative Example 3 and that an ethylene/propylene mixed gas having an ethylene/propylene mole ratio of 0.0017 was substituted for propylene.

Pelletization and film fabrication were carried out in the same manner as in Example 6.

The physical property values of the propylene base polymer and the biaxially oriented polypropylene film thus obtained are shown in Table 4, Table 5 and Table 6.

Example 10

Powdery propylene base polymer was obtained at a production rate of 15.9 kg/hour according to the method described in Example 9, except that the hydrogen/propylene mole ratio was set to 0.0025 in the main polymerization of Example 9 and that an ethylene/propylene mixed gas having an ethylene/propylene mole ratio of 0.001 was substituted for propylene.

Pelletization and film fabrication were carried out according to the method described in Example 6.

The physical property values of the propylene base polymer and the biaxially oriented polypropylene film thus obtained are shown in Table 4, Table 5 and Table 6.

TABLE 4

|  | Example 6 | Comparative Example 3 | Example 7 | Example 8 | Example 9 | Comparative Example 4 | Example 10 |
|---|---|---|---|---|---|---|---|
| [mmmm] | 0.9386 | 0.9723 | 0.9254 | 0.9295 | 0.9070 | 0.9519 | 0.9058 |
| α | 0.994 | 0.996 | 0.990 | 0.994 | 0.990 | 0.994 | 0.990 |
| Pentane extractables (%) | 0.5 |  | 0.7 | 0.6 | 0.7 | 0.7 | 0.7 |
| Heptane extractables (%) | 2.0 | 0.3 | 3.3 | 2.4 | 4.3 | 2.0 | 4.5 |
| Ethylene content (%) | 0 | 0 | 0 | 0.25 | 0.24 | 0.21 | 0.43 |
| MRF (dg/min) | 2.2 | 2.5 | 2.3 | 2.4 | 2.8 | 2.6 | 2.6 |

TABLE 5

|  | Example 6 | Comparative Example 3 | Example 7 | Example 8 | Example 9 | Comparative Example 4 | Example 10 |
|---|---|---|---|---|---|---|---|
| Weight average molecular weight of solubles of 0° C. or lower | $7.4 \times 10^4$ | $1.1 \times 10^4$ | $7.3 \times 10^4$ | $8.0 \times 10^4$ | $7.6 \times 10^4$ | $2.4 \times 10^4$ | $8.4 \times 10^4$ |
| Weight average molecular weight of solubles of 50° C. or lower | $7.7 \times 10^4$ | $1.1 \times 10^4$ | $7.3 \times 10^4$ | $8.0 \times 10^4$ | $6.6 \times 10^4$ | $1.1 \times 10^4$ | $7.0 \times 10^4$ |
| Weight average molecular weight of solubles of 90° C. or lower | $1.8 \times 10^5$ | $1.8 \times 10^4$ | $3.1 \times 10^5$ | $1.4 \times 10^5$ | $1.6 \times 10^5$ | $3.7 \times 10^4$ | $2.1 \times 10^5$ |

TABLE 6

|  | Young's Modulus [MPa] MD/TD | Heat-Shrinkage Ratio [%] MD/TD | Adhesiveness N/15 mm |
|---|---|---|---|
| Example 6 | 2100/3700 | 3.5/2.5 | 1.0 |
| Comparative Example 3 | 2300/3900 | 3.0/2.0 | 0.2 |
| Example 7 | 2050/3550 | 4.0/3.0 | 1.1 |
| Example 8 | 2050/3600 | 4.0/3.0 | 1.2 |
| Example 9 | 2000/3500 | 4.3/3.3 | 1.3 |
| Comparative Example 4 | 2100/3700 | 4.0/3.0 | 0.5 |
| Example 10 | 1950/3450 | 4.5/3.5 | 1.3 |

What is claimed is:

1. A propylene base polymer having the following characteristics (1) to (5):

(1) it is a propylene homopolymer or a propylene-olefin copolymer with at least one olefin selected from α-olefins having 4 or more carbon atoms, wherein a propylene content in this copolymer is 98% by weight or more, (2) a melt flow rate (MFR: 230° C., 21.18N) falls in a range of 0.5 to 20 dg/min, (3) an isotactic pentad fraction (mmmm) falls in a range of 0.89 to 0.95, (4) boiling pentane extractables (C5-Ext) are 0.5% by weight or more; boiling heptane extractables (C7-Ext) are 5% by weight or less; and (C5-Ext) and (C7-Ext) reside in a relation of (C7-Ext)<3.5 (C5-Ext), and (5) solubles of 0° C. or lower obtained by a cross fractionation chromatography have a weight average molecular weight of $7 \times 10^4$ g/mol or more, and solubles of 50° C. or lower have a weight average molecular weight of $6 \times 10^4$ g/mol or more.

2. A propylene base polymer according to claim 1, further having the following characteristics (6) and (7):

(6) existential ratio of a meso dyad and a racemic dyad in the pentad comply with a two-site model based on Bernoullian statistics, wherein a statistical parameter a falls in a range of $0.989 \leq \alpha \leq 0.995$, and (7) solubles of 90° C. or lower obtained by a cross fractionation chromatography have a weight average molecular weight of $6 \times 10^4$ g/mol or more.

3. A film prepared by using a polypropylene composition obtained by adding an antistatic agent to the propylene base polymer as described in claim 1.

4. A film prepared by using the propylene base polymer as described in claim 2 having a high peel strength when deposited on a metal surface.

5. A propylene base polymer according to claim 1, wherein the polymer has improved high rigidity and excellent metallizability.

* * * * *